July 8, 1958 — H. I. EWEN — 2,842,753
MONITORING SYSTEMS
Filed June 8, 1954
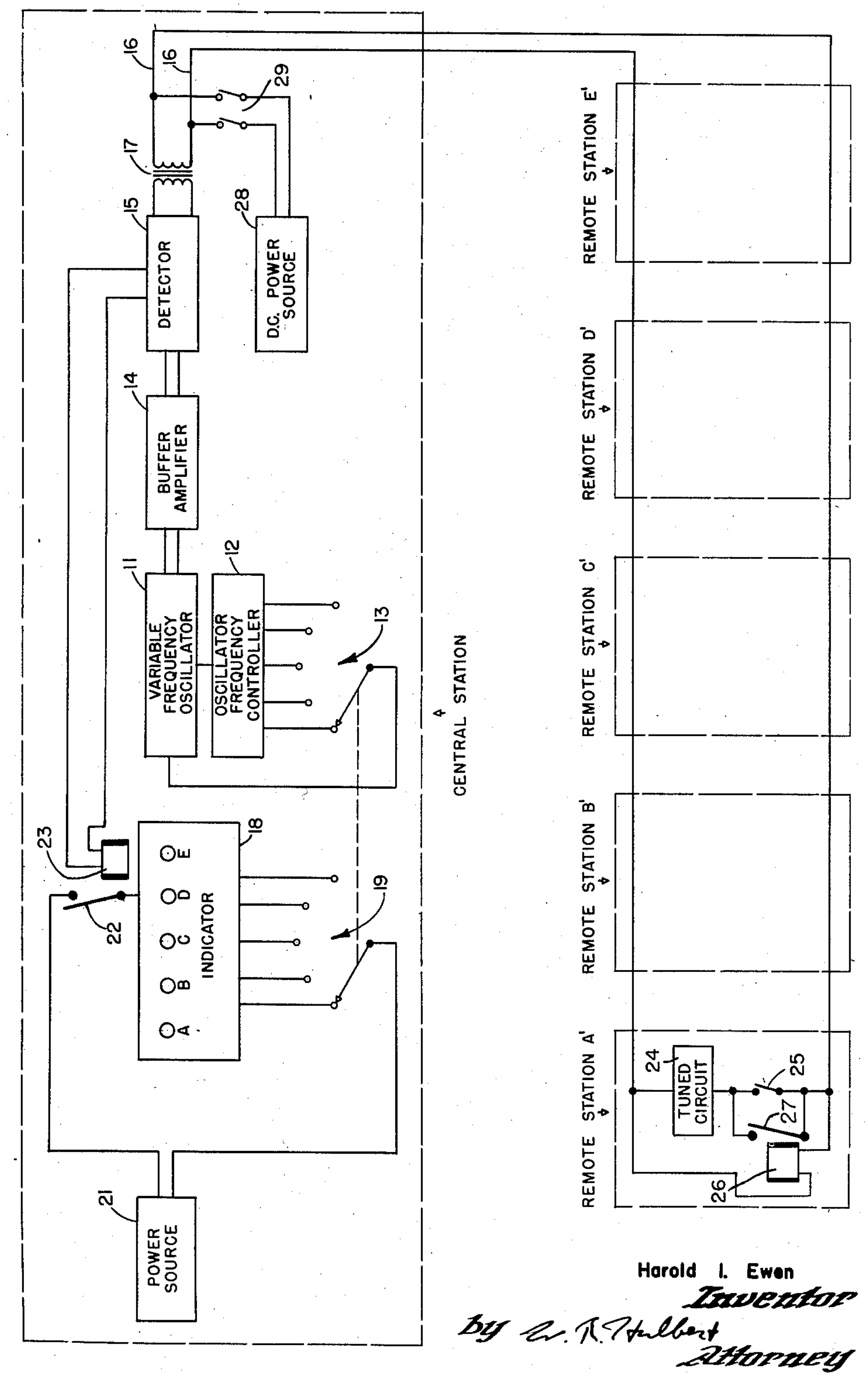
Harold I. Ewen
Inventor
by W. R. Hulbert
Attorney United States Patent Office 2,842,753

Patented July 8, 1958

2,842,753

MONITORING SYSTEMS

Harold I. Ewen, Cambridge, Mass.

Application June 8, 1954, Serial No. 435,302

3 Claims. (Cl. 340—171)

This invention relates generally to monitoring systems, and more particularly to a multi-frequency monitoring system for centrally displaying switch conditions or the like.

It is often required that the conditions of a plurality of remote station switches be individually indicated at a central station, so that the central station operator may know of the occurrence of some event as well as its location. One example of a system which usually requires this type of information is a fire alarm system having a number of remote stations, and a central station for monitoring the remote stations. According to the present invention, such a monitoring function is performed with only a single pair of wires running from the central station to all of the remote stations. In this way, a substantial saving installation and maintenance costs is effected.

Briefly, a variable frequency oscillator and frequency controller are provided at the central station to interrogate each remote station separately in point of time. There is provided at each remote station, a tuned circuit resonant at one of a plurality of discretely different frequencies which may be selected by the frequency controller and generated by the oscillator. If a particular event, such as a fire, occurs at one of the stations, the tuned circuit located at that station may be connected by the manual or automatic closing of a switch to the oscillator, and is then responsive when its corresponding frequency is generated. Such response, as reflected in a radically altered load impedance, is detected and indicated at the central station by turning on a panel light, for example.

Although the responses of the various remote stations in terms of load impedance changes are essentially the same, the particular remote station responding may be individually indicated nevertheless. This is because of the fact that a separate indicator circuit is energized for each oscillator frequency selected, the indicator selection process being synchronized with the frequency selection process. Thus, a plurality of remote stations may be continuously monitored, if desired, by generating cyclically the frequencies to which the resonant circuits are tuned and by providing for the energization of individual indicator circuits in synchronism with the cyclic frequency variations.

It is an object of this invention, therefore, to provide an improved system for determining switch conditions or the like at a plurality of remote stations.

It is another object of this invention to provide such a monitoring system utilizing a single transmission carrier, such as a pair of transmission lines.

It is a further object to provide a system for transmitting to a plurality of remote stations signals of successively different frequency and for indicating at a central station the individual responses of the remote stations.

It is a still further object to provide a monitoring system which includes means for rapid self-testing.

The novel features of this invention, together with further objects and advantages thereof, will be more readily understood when considered in connection with the accompanying drawing, in which:

The sole figure is a diagram of the monitoring system according to this invention.

Referring now to the drawing, a variable frequency oscillator 11 and an oscillator frequency controller 12 including a multi-pole selector switch 13 are provided at the central station for generating signals of selected frequency. It has been found preferable to generate signals in the sonic or ultrasonic frequency ranges but, as will become apparent, signals within some other frequency spectrum may also be used. Coupled to oscillator 11 is a buffer amplifier 14 to amplify the signals and to isolate oscillator 11 from the remainder of the system. In this way, the amplitude and frequency of the signals, as generated by oscillator 11 are made substantially independent of the magnitude of the load to which the signals are ultimately delivered. The amplified signals from buffer amplifier 14 are in turn passed through a detector 15 and then applied to a pair of transmission lines 16 by a transformer 17. Detector 15 is adapted to sense the magnitude of the load coupled to transmission lines 16 by virtue of the increased amount of power supplied by buffer amplifier 14 when the load impedance is decreased. There is also provided at the central station an indicator 18 including a multi-pole selector switch 19 for coupling a selected one of indicator circuits A, B, C, D, and E to a power source 21, selector switch 19 being synchronized with selector switch 13. Completing the circuit between indicator 18 and power source 21 is a pair of normally open relay contacts 22 actuated by a relay coil 23 coupled to detector 15.

Transmission lines 16 deliver the signals generated by oscillator 11 from the central station to a plurality of remote stations, five such stations A′, B′, C′, D′, and E′ being shown in the drawing by way of example. Remote station A′ includes a tuned circuit 24 coupled to transmission lines 16 through a switch element 25. Tuned circuit 24 is series resonant at one of the operating frequencies of oscillator 11 which may be selected by switch 13. Switch element 25 is adapted to couple tuned circuit 24 to transmission lines 16 in response to some condition, such as a fire, which may occur at station A′. Stations B′, C′, D′, and E′ are similar to station A′ and are likewise provided with individual tuned circuits and switch elements, not shown for purposes of clarity in the drawing. The tuned circuits of stations B′, C′, D′, and E′ are series resonant at frequencies different from that of tuned circuit 24 of station A′ and different from each other, however, such frequencies also being selectable by means of selector switch 13 operating in conjunction with frequency controller 12.

Assuming that an event to which switch element 25 is responsive does occur at one of the remote stations, such as station A′, switch element 25 will be closed, coupling tuned circuit 24 to transmission lines 16. As a result, buffer amplifier 14 will be heavily loaded when the operating frequency of oscillator 11 is caused to equal the resonant frequency of tuned circuit 24 due to the relatively low impedance of tuned circuit 24 at this frequency. In this case, relay coil 23 will be energized by detector 15 closing contacts 22 and thereby energizing a selected one of the indicator circuits A, B, C, D, and E.

If indicator circuits A, B, C, D, and E are designated as corresponding to remote stations A′, B′, C′, D′, and E′, the central station operator may be apprised of the particular remote station or stations having closed switch elements by reference to the energized ones of indicator circuits A, B, C, D, and E. This is because selector switches 13 and 19 are synchronized, thereby synchronizing the indicator circuit selection process with the selection of a particular oscillator frequency. In the aforementioned case, therefore, indicator circuit A would be selected by switch 19 for energization by power source 21 when switch 13 is positioned to select an oscillator frequency equal to the resonant frequency of tuned circuit 24. As shown in Fig. 1, switches 13 and 19 have assumed a position of contact with the poles toward the left of Fig. 1 in order to accomplish this result. Should the switch element at another remote station be closed, a repositioning of switch 13 causing the operating frequency of oscillator 11 to equal the resonant frequency of the tuned circuit at that station, will also reposition switch 19 to energize the indicator circuit corresponding to that station. For monitoring all of the remote stations continuously, switches 13 and 19 may be cyclically repositioned, if desired. In this case, switches 13 and 19 may comprise rotary selector switches continuously driven by a motor so that all of the resonant frequencies of the tuned circuits are transmitted in a matter of seconds. Frequencies of 10 kilocycles (kc.), 20 kc., 30 kc., 40 kc. and 50 kc. might be used, for example. It may also be found desirable to provide indicator circuits A, B, C, D, and E with holding circuits so that when an individual indicator circuit is energized, it will remain energized until manually deenergized by the central station operator.

In order to determine whether the system is operating properly there is provided at each remote station, as at station A′, a relay, having a coil 26 coupled to transmission lines 16, and a pair of normally open contacts 27 shunted across switch element 25. To energize coil 26 thereby closing contacts 27, the central station includes a direct current (D. C.) power source 28 and a switch 29. D. C. source 28 is detachably coupled to transmission lines 16 by means of switch 29, but does not affect the central station portion of the system directly because of the isolation provided by transformer 17. When switch 29 is closed, however, closing contacts 27, all of the tuned circuits will be coupled to buffer amplifier 14 causing relay contacts 22 to be closed irrespective of which oscillator frequency is selected. Therefore, if the system is operating properly, all of the indicator circuits will have been energized after all of the oscillator frequencies have been selected. Faulty operation at any of the frequencies of the oscillator 11 or at any station A′, B′, etc., may therefore be readily detected.

While I have herein disclosed and described a presently preferred embodiment of the invention it will be evident nevertheless that the same is susceptible of various modifications and changes within the skill of those versed in this art.

Therefore what I claim is:

1. The combination with a plurality of switch elements each located at a remote station of a system for determining the individual conditions of said switch elements comprising: at a central station, a plurality of indicator circuits corresponding to said switch elements, respectively; a power source; a first multi-pole selector switch coupled between said power source and said indicator circuits; a variable frequency oscillator operable at a plurality of frequencies; an oscillator frequency controller coupled to said oscillator and including a second multi-pole selector switch for selectively controlling the operating frequency of said oscillator, said first selector switch being synchronized with said second selector switch; and, associated with said remote stations, a corresponding plurality of series resonant tuned circuits, said tuned circuits having resonant frequencies equal to said plurality of operating frequencies, respectively, and respective ones of said tuned circuits being coupled to said oscillator through respective ones of said switch elements; said combination including detection means at said central station coupled between said tuned circuits and said oscillator for sensing a change in the load condition of said oscillator when one of said switch elements is closed and when the operating frequency of said oscillator is made equal to the resonant frequency of the tuned circuit coupled to said oscillator through the closed one of said switch elements; and means also located at said central station responsive to said detection means to couple to said power source a selected one of said indicator circuits, said one of the indicator circuits corresponding to said one of the switch elements.

2. The combination according to claim 1 including a buffer amplifier at said central station coupled between said oscillator and said detection means.

3. The combination with a plurality of switch elements each located at a remote station of a system for determining the individual conidtions of said switch elements comprising: at a central station, a plurality of indicator circuits corresponding to said switch elements, respectively; a power source; a first multi-pole selector switch coupled between said power source and said indicator circuits; a variable frequency oscillator operable at a plurality of frequencies; an oscillator frequency controller including a second multi-pole selector switch for selectively controlling the operating frequency of said oscillator, said first selector switch being synchronized with said second selector switch; a transformer having an input circuit coupled to said oscillator and an output circuit; and, associated with said remote stations, a corresponding plurality of tuned circuits, said tuned circuits having resonant frequencies equal to said plurality of operating frequencies, respectively, and respective ones of said tuned circuits being coupled to said output circuit through respective ones of said switch elements; said combination including a detector at said central station coupled between said input circuit and said oscillator for sensing a change in the load condition of said oscillator when one of said switch elements is closed and when the operating frequency of said oscillator is made equal to the resonant frequency of the tuned circuit coupled to said oscillator through the closed one of said switch elements; a relay also at said central station responsive to said detector to couple to said power source a selected one of said indicator circuits; a direct current source detachably connected to said output circuit; and associated with said remote stations, a plurality of relays located in proximity to said plurality of switch elements, respectively, each one of said relays having a coil coupled to said output circuit, and a pair of contacts, said contacts being connected in a parallel relationship with said switch elements, respectively, thereby to intercouple all of said tuned circuits and said output circuit when said direct current source is connected to said output circuit.

References Cited in the file of this patent

UNITED STATES PATENTS

| | | |
|---|---|---|
| 1,443,165 | Brown | Jan. 23, 1933 |
| 2,581,056 | Walmsley | Jan. 1, 1952 |
| 2,660,511 | Scherbatskoy | Nov. 24, 1953 |